United States Patent
Duan et al.

(10) Patent No.: US 10,759,303 B2
(45) Date of Patent: Sep. 1, 2020

(54) AUTONOMOUS VEHICLE ROUTE PLANNING

(71) Applicant: Ford Global Technologies, LLC, Dearborn, MI (US)

(72) Inventors: Xiaohong Nina Duan, Canton, MI (US); Yanan Zhao, Ann Arbor, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 16/110,537

(22) Filed: Aug. 23, 2018

(65) Prior Publication Data

US 2020/0062126 A1 Feb. 27, 2020

(51) Int. Cl.
*B60L 58/25* (2019.01)
*G05D 1/02* (2020.01)
*B60L 15/00* (2006.01)
*B60L 58/26* (2019.01)
*B60K 6/28* (2007.10)

(52) U.S. Cl.
CPC .............. *B60L 58/25* (2019.02); *B60L 15/00* (2013.01); *B60L 58/26* (2019.02); *G05D 1/0223* (2013.01); *B60K 6/28* (2013.01); *B60L 2240/12* (2013.01); *B60L 2240/545* (2013.01); *B60L 2240/642* (2013.01); *B60Y 2200/91* (2013.01); *B60Y 2200/92* (2013.01); *G05D 2201/0213* (2013.01)

(58) Field of Classification Search
CPC .......... B60L 58/25; B60L 58/26; B60L 15/00; B60L 2240/12; B60L 2240/545; B60L 2240/642; G05D 1/0223; G05D 2201/0213; B60K 6/28; B60Y 2200/91; B60Y 2200/92
See application file for complete search history.

(56) References Cited

U.S. PATENT DOCUMENTS

| 6,480,767 B2 | 11/2002 | Yamaguchi et al. |
| 8,190,320 B2 * | 5/2012 | Kelty ................ B60L 15/2045 701/22 |
| 9,290,108 B2 * | 3/2016 | Payne ................ B60L 11/1874 |

(Continued)

FOREIGN PATENT DOCUMENTS

| DE | 102008039950 A1 * | 3/2010 | ............ B60W 10/06 |
| DE | 102013110346 A1 * | 4/2014 | ........ B60W 50/0097 |
| WO | WO-2006022362 A2 * | 3/2006 | .......... H01M 10/486 |

OTHER PUBLICATIONS

Translation of DE102008039950 (Year: 2010).*
Machine Translation WO 2006022362 (Year: 2006).*
Translation of DE-102013110346-A1 (Year: 2014).*

*Primary Examiner* — Anne Marie Antonucci
*Assistant Examiner* — Sahar Motazedi
(74) *Attorney, Agent, or Firm* — David Kelley; Brooks Kushman P.C.

(57) ABSTRACT

An autonomous vehicle includes an electric powertrain having an electric machine and a traction battery. A vehicle controller is programmed to command power to the electric machine to propel the vehicle along a segment of a route according to a predetermined speed profile that is derived from a predicted heat generation of the battery for the segment such that actual temperatures of the battery remain below a temperature threshold for the segment.

18 Claims, 5 Drawing Sheets

(56) References Cited

U.S. PATENT DOCUMENTS

| | | |
|---|---|---|
| 9,437,058 B2 | 9/2016 | Luke et al. |
| 2010/0029436 A1* | 2/2010 | Katsuta .................... B60K 6/36 |
| | | 477/5 |
| 2015/0039391 A1 | 2/2015 | Hershkovitz et al. |
| 2019/0161076 A1* | 5/2019 | Plianos ............. B60W 50/0097 |

* cited by examiner

AUTONOMOUS VEHICLE ROUTE PLANNING

TECHNICAL FIELD

This disclosure relates to route planning for autonomous vehicles, and more specifically to planning vehicle speeds based on battery thermal-management constraints so that battery temperatures remain below a threshold for the route.

BACKGROUND

Vehicles may include autonomous driving systems configured to drive the vehicle with minimal user input. Autonomous driving systems receive data from on-board vehicle systems, such as cameras, Radar, etc., as well as from external sources. This data is used to generate commands, e.g., steering, braking, and acceleration, for autonomously driving the vehicle.

An autonomous vehicle may include an electric powertrain having an electric machine(s) powered by a traction battery. The traction battery produces heat when providing power to the electric machine, and require a thermal-management system to thermally regulate the temperature of the battery cells. Example thermal-management systems include air and liquid cooling systems. Multiple types of liquid cooling systems are available such as radiator cooling, chiller cooling (which utilizes a heat pump), or combinations thereof.

Traction batteries are operated within upper and lower temperature limits to prevent battery degradation and optimize performance. Hybrid vehicles are typically programmed to power limit the battery in response to these upper and lower temperature limits being exceeded. Thus, the electric range of the vehicle may be reduced due to deficiencies in battery cooling.

SUMMARY

According one embodiment, an autonomous vehicle includes an electric powertrain and a controller. The controller is programmed to autonomously operate the powertrain to maintain constant vehicle speed along a segment of a route responsive to predicted battery temperatures for the segment not exceeding a threshold, and autonomously operate the powertrain to vary vehicle speed along the segment responsive to the predicted battery temperatures exceeding the threshold such that actual battery temperatures remain below the threshold for the segment.

According to another embodiment, an autonomous vehicle includes an electric powertrain and a controller. The controller is programmed to autonomously operate the powertrain to propel the vehicle along a segment of a route according to a predetermined first speed profile that has a constant vehicle speed responsive to predicted battery temperatures for the segment not exceeding a threshold. The controller is further programmed to autonomously operate the powertrain to propel the vehicle along the segment according to a predetermined second speed profile that has multiple vehicle speeds responsive to the predicted battery temperatures exceeding the threshold such that actual battery temperatures remain below the threshold for the segment.

According to yet another embodiment, an autonomous vehicle includes an electric powertrain having an electric machine and a traction battery. A vehicle controller is programmed to command power to the electric machine to propel the vehicle along a segment of a route according to a predetermined speed profile that is derived from a predicted heat generation of the battery for the segment such that actual temperatures of the battery remain below a temperature threshold for the segment.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read-only memory (ROM), electrically programmable read-only memory (EPROM), electrically erasable programmable read-only memory (EEPROM), or other suitable variants thereof) and software which cooperate with one another to perform operation(s) disclosed herein. In addition, any one or more of the electric devices may be configured to execute a computer program that is embodied in a non-transitory computer-readable storage medium that includes instructions to program a computer or controller to perform any number of the functions as disclosed.

Figure 1:
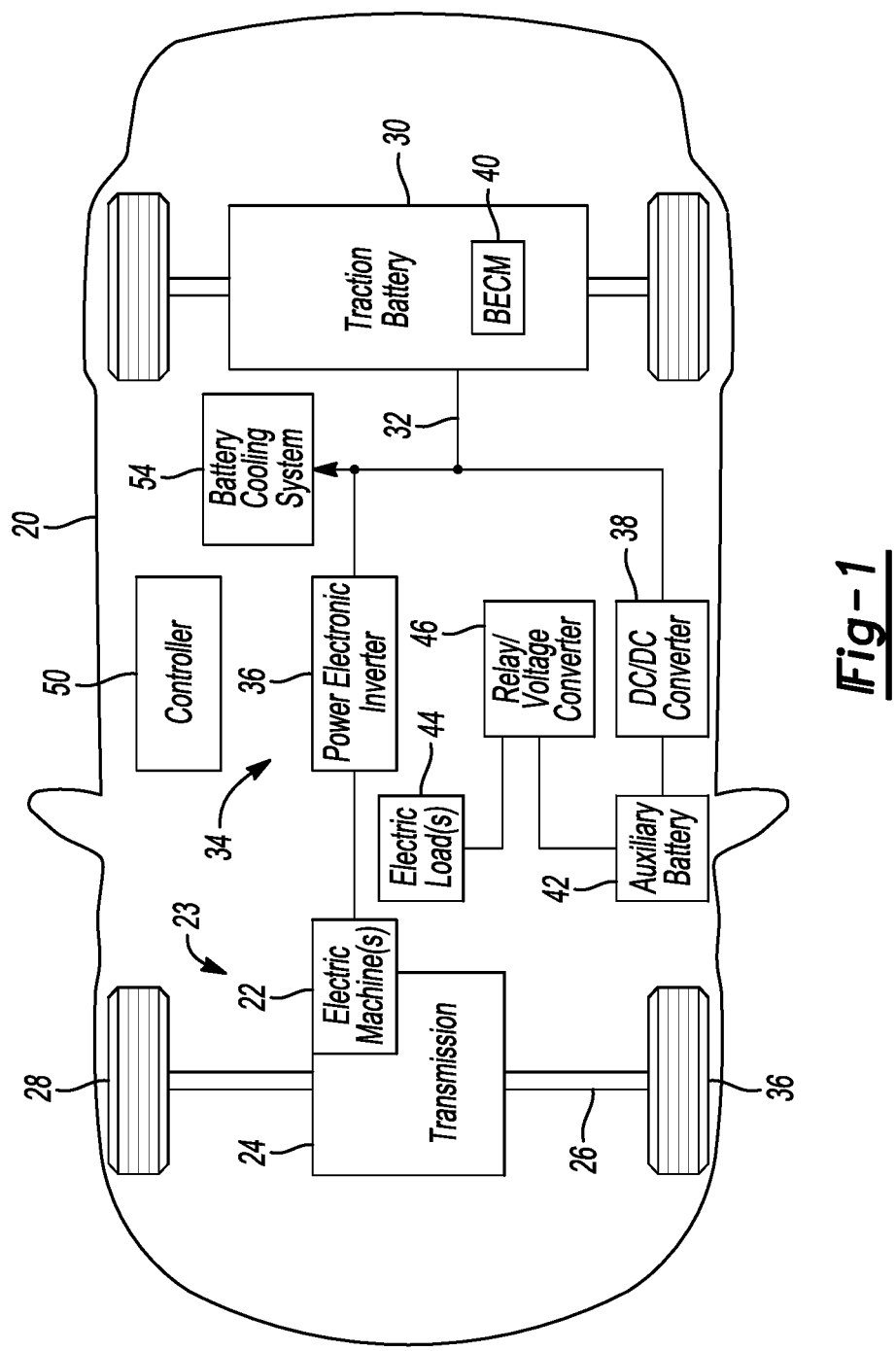
FIG. 1 is a block diagram of a representative electrified vehicle.

FIG. 1 is a block diagram of a representative electrified vehicle embodiment having at least one controller programmed to autonomously drive the vehicle. While a fully electric vehicle is illustrated in this representative embodiment, those of ordinary skill in the art will recognize that the disclosed embodiments may also be utilized in other types of electrified vehicles, such as hybrid vehicles.

In the representative implementation illustrated in FIG. 1, a vehicle 20 may include one or more electric machines 22 mechanically connected to a transmission 24, such as a one-speed gearbox. The electric machine 22 may be capable of operating as a motor or a generator. The transmission 24 is mechanically connected to a drive shaft 26 that is mechanically connected to the wheels 28. The electric machine 22 can provide propulsion and deceleration capability. The electric machine 22 may also act as a generator to provide fuel economy benefits by recovering energy that would normally be lost as heat in the friction braking system during regenerative braking.

A traction battery or traction battery pack 30 stores energy in a plurality of individual battery cells connected together to provide a desired voltage and charge capacity for the electric machine 22. In one embodiment, battery pack 30 includes an array of lithium-ion battery cells. The vehicle battery pack 30 typically provides a high-voltage direct current (DC) output to a high-voltage bus 32, although the voltage and current may vary depending on particular operating conditions and loads. The traction battery 30 is electrically connected to one or more external circuits 34, which may include a power electronics or inverter circuit 36, and a DC/DC converter circuit 38, for example. One or more contactors may isolate the traction battery 30 from other components when opened, and connect the traction battery 30 to the other components when closed. The traction battery 30 may include various internal circuits for measuring and monitoring various operating parameters including cell current and individual cell voltage. Parameters such as voltage, current and resistance for a battery cell or a group of battery cells (sometimes referred to as a block or brick) may be monitored and/or controlled. The battery 30, the electric machine 22, the transmission 24, and other components make up an electric powertrain 23.

In addition to providing energy for propulsion, the traction battery 30 may provide energy for other external circuits 34 connected to the high-voltage bus 32. The power-distribution system of vehicle 20 may also include a DC/DC converter module or circuit 38 that converts the high-voltage DC output of the traction battery 30 to a low-voltage DC supply that is compatible with other vehicle loads that may be directly connected. Other external high-voltage circuits or loads, such as those for cabin or component heaters, may be connected directly to the high-voltage bus 32 without the use of the DC/DC converter circuit 38.

Vehicle 20 may also include an auxiliary battery 42 having a relatively lower nominal voltage (such as 24V or 48V, for example) and may be implemented using different battery chemistries than the traction battery 30. The auxiliary battery 42 may also be referred to as a low-voltage battery, starter battery, or simply the vehicle battery for various applications. The auxiliary battery 42 may be used to power various low-voltage components, controllers, modules, motors, actuators, sensors, etc. generally represented by electric loads 44. One or more relay/voltage converters 46 may be used to power vehicle electrical load(s) 44.

The traction battery 30 may be recharged by an external power source. The external power source may include an electrical outlet connected to the power grid. The external power source may be electrically connected to electric vehicle supply equipment (EVSE). The EVSE may provide circuitry and controls to regulate and manage the transfer of energy between the power source and the vehicle 20. The external power source may provide DC or AC electric power to the EVSE. The EVSE may have a charge connector for plugging into a charge port of the vehicle 20. The charge port may be electrically connected to a charger or on-board power conversion module. Alternatively, various components described as being electrically connected may transfer power using a wireless inductive coupling.

The various components illustrated in FIG. 1 may have one or more associated controllers, control modules, and/or processors such as controller 50 to control vehicle and traction battery operation. The controller 50 may be one or more controllers that cooperate with each other to control the vehicle. Any reference herein to "a controller" means one or more controllers. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components. One or more controllers may operate in a stand-alone manner without communication with one or more other controllers. The controller 50 is programmed to control various charging and discharging functions, battery cell charge balancing, battery pack voltage measurements, individual battery cell voltage measurements, battery over-charge protection, battery over-discharge protection, battery end-of-life determination, battery current polarity or direction (charging and discharging), etc.

The controller(s) 50 may include and/or communicate with various types of non-transitory computer-readable storage media including persistent and temporary storage devices to store control logic, algorithms, programs, operating variables, and the like. In one embodiment, the controller 50 may communicate with memory for storing values associated with battery cell desired open circuit voltage values, thresholds, or patterns. Similarly, controller 50 may communicate with memory having values stored in lookup tables or arrays associated with battery cell internal resistance based on battery parameters such as temperature, state of charge (SOC), age, etc. In one embodiment, controller 50 communicates with memory having a battery power vs. temperature lookup table. The controller 50 may also communicate with memory storing battery charge and discharge power limits, and/or battery minimum and maximum temperature limits.

As an autonomous vehicle, the controller 50 is configured to drive the vehicle 20 along a route, which may be user-selected, with no or minimal input from vehicle occupants. In order to accomplish autonomous driving, the vehicle may be equipped with a vision system that includes radar, lidar, ultrasonic sensors, cameras, etc. The vehicle 20 may also be equipped with communication systems that allow the vehicle 20 to communicate with other vehicles, central stations, and the like, and navigation systems such as global positioning systems (GPS). The vehicle may include one or more user interfaces, such as touch screens, voice systems, etc., allowing communication between the vehicle 20 and the vehicle occupants. The controller 50 is configured to receive signals from relevant systems and issue commands to drive the vehicle autonomously. The commands may include propulsion commands, e.g. acceleration and speed, braking commands, e.g. friction braking and regenerative braking, steering commands, and the like. Baseline profiles for these commands may be generated during route calculation. But of course, the vehicle 20 is capable of deviating from these profiles in real-time based on actual operating conditions.

Driving of the vehicle 20 requires the traction battery 30 to supply voltage and current to the electric machine 22, which generates heat. The vehicle 20 includes a battery-cooling system 54 for thermally regulating the battery 30. The battery-cooling system 54 may take various forms in different embodiments. For example, the battery-cooling system 54 may be an air-cooled system that circulates air across the cells of the battery 30 to cool the battery. Alternatively, the battery-cooling system 54 may be a liquid-cooled system that circulates coolant through or around the traction battery 30 to cool the cells. Multiple types of liquid-cooled systems can be utilized in the vehicle 20. In one embodiment, the coolant circulating through the battery 30 may be routed to an external radiator to exchange heat with an outside airstream. In another embodiment, the coolant circulating through the battery may be routed to a battery chiller that is associated with a heat pump of the vehicle 20, such as the vehicle air-conditioning system. In yet another embodiment, the cooling system 54 may be capable of circulating coolant to a radiator and to a chiller.

The battery-cooling system 54 may be powered by the traction battery 30 and may consume power otherwise available for vehicle propulsion. Excessive use of the cooling system 54 can significantly reduce electric range. Thus, it is advantageous to utilize the battery-cooling system 54 efficiently to maximize range of the vehicle 20 while also maintaining the battery 30 within a desired range of temperatures.

Temperature change of the traction battery 30 can be calculate by equation 1, where I is battery current, R is battery resistance, SOC is battery state of charge, $T_{bat}$ is battery temperature, h is battery heat convection coefficient, P_cooling is consumed power of battery-cooling system, $T_{enviroment}$ is inlet coolant temperature of the cooling system, and α is battery heat capacity.

$$\Delta T_{bat} = \frac{1}{\alpha}\left\{\int_0^t I^2 R(SoC, T_{bat})dt - \int_0^t h(\text{P\_cooling})(T_{bat} - T_{environment})dt\right\} \quad \text{(eq. 1)}$$

The first term, $\int_0^t I^2R(SoC, T_{bat})dt$, represents heat generated by the battery and is largely dependent upon current. The second term, $\int_0^t h(\text{P\_cooling})(T_{bat}-T_{environment})dt$, represents the cooling ability of the battery-cooling system 54.

Figure 2:
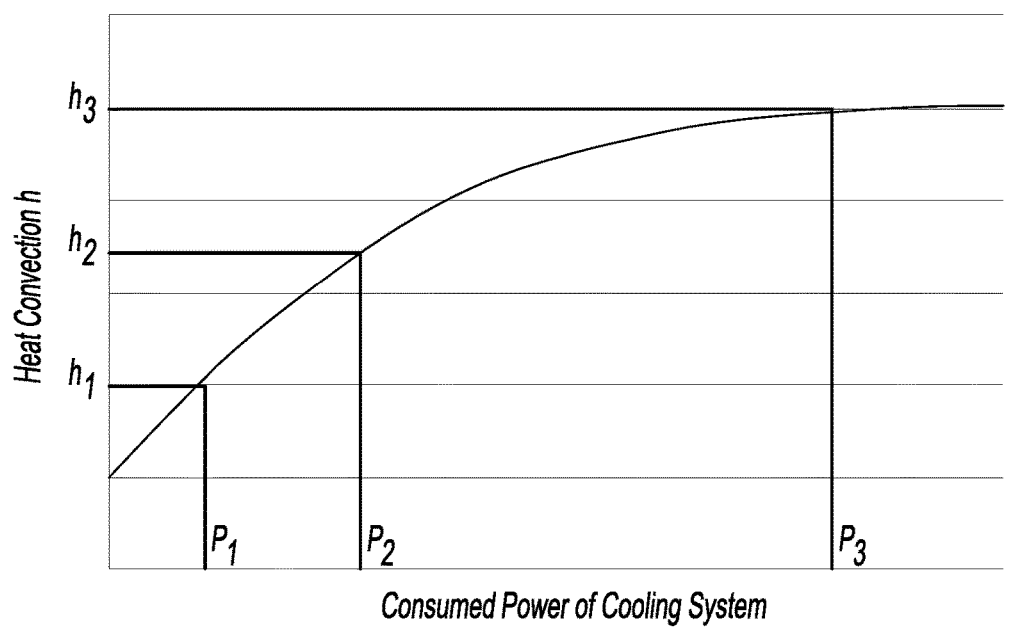
FIG. 2 is a plot showing the power consumption for battery heat convection coefficients.

FIG. 2 illustrates a graph of heat convection coefficients (h) (y-axis) and the amount of power consumed (x-axis) by the cooling system 54 to achieve those heat coefficients (h). As shown by the graph, the amount of power (P) required to increase the convection coefficient (h) follows a nonlinear curve and the gains in h for each unit of power (P) greatly diminish as h increases. Thus, it is more efficient to operate the cooling system 54 with lower values of h.

Operating the cooling system 54 with lower values of h, however, is not always possible due to power demands from the electric machine to maintain a desired driving speed. The desired driving speed may force the cooling system 54 to operate at maximum capacity in order to avoid overheating of the traction battery 30. The controls and methods of this disclosure account for battery thermal management while route planning so that the cooling system 54 may be operated in a most efficient range of h while also not exceeding the upper temperature limit of the battery 30. This will be described in more detail below.

Figure 3:
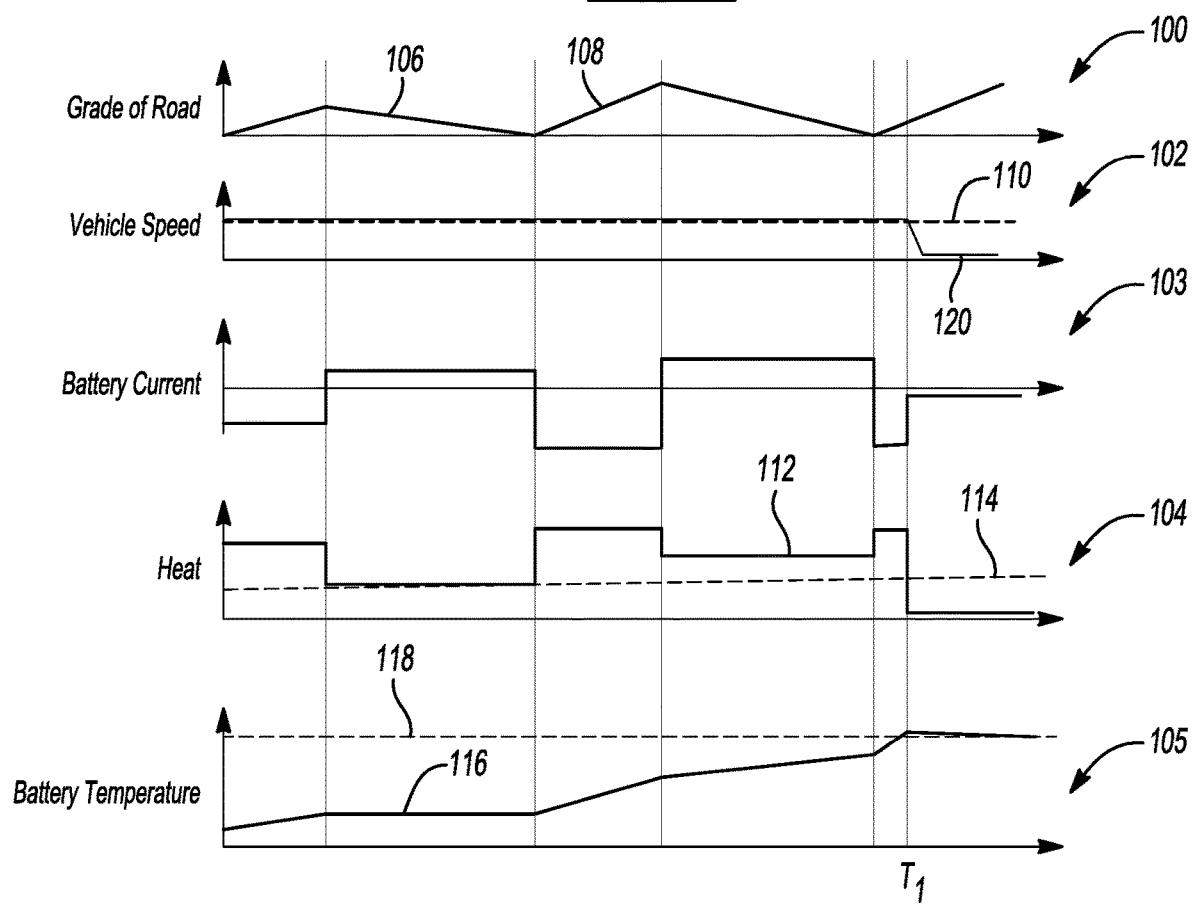
FIG. 3 is a series of plots showing vehicle operating conditions for a segment of a route according to prior-art designs.

Before turning to the controls and methods of this disclosure, common problems associated with the current state-of-the-art are highlighted by the example of FIG. 3. Referring to FIG. 3, the plot 100 illustrates the road grade for a segment. This particular segment 106 includes sections 108 of increasing road grade and decreasing road grade. The vehicle speed profile 110 for this segment 106 is constant. Maintaining a constant speed over variable road grade requires the battery to discharge when traveling uphill and charge (regeneratively brake) while traveling downhill to maintain the constant speed as shown by plot 103. Battery temperature is highly dependent upon current output of the traction battery. As shown by plot 104, attempting to maintain a constant speed over the varying road grade of segment 106 generates a significant amount of heat 112. As explained above, battery-cooling systems have a maximum capacity and operate more efficiently when operating in a lower range of that capacity. In this example, the heavy charging and discharging of the battery to maintain the vehicle speed profile 110 is generating heat 112 in excess of the cooling capacity 114. Thus, the temperature of the battery 116 is continuing to increase as shown by plot 105. To prevent battery damage, traction batteries have a maximum temperature limit 118, and vehicle controllers typically prevent the battery from exceeding that limit 118 by power limiting the battery in response to the battery temperature exceeding the upper limit 118. In this example, the battery temperature exceeds the upper limit 118 at time T1. In response, the battery is power limited causing the actual vehicle speed 120 drop below the speed profile 110 at time T1. Thus, after time T1, the vehicle will be operated at a speed slower than that desired by the occupant of the vehicle until the battery temperature is reduced below the upper limit 118. Most occupants find it highly dissatisfying to operate the vehicle in a power-limited mode, and thus conditions such as those described in FIG. 3 should be avoided.

The scenario of FIG. 3 can be avoided by considering battery-heat generation and cooling-system capacity during route planning, and more specifically during generation of the vehicle speed profile(s) for the route. In one embodiment of the controls, a two-phase methodology is used to optimize the speed profile(s) for a route. In the first phase, a plurality of possible speed profiles are generated based on battery power capability, e.g., battery charging and discharging limits, and speed profiles that pass the battery power capability are saved for further screening in phase two. In the second phase, predicted battery heat generation and cooling system energy consumption are determined for each of the saved profiles, and optimum one of the saved profiles is chosen to be used for the route.

Figure 4:
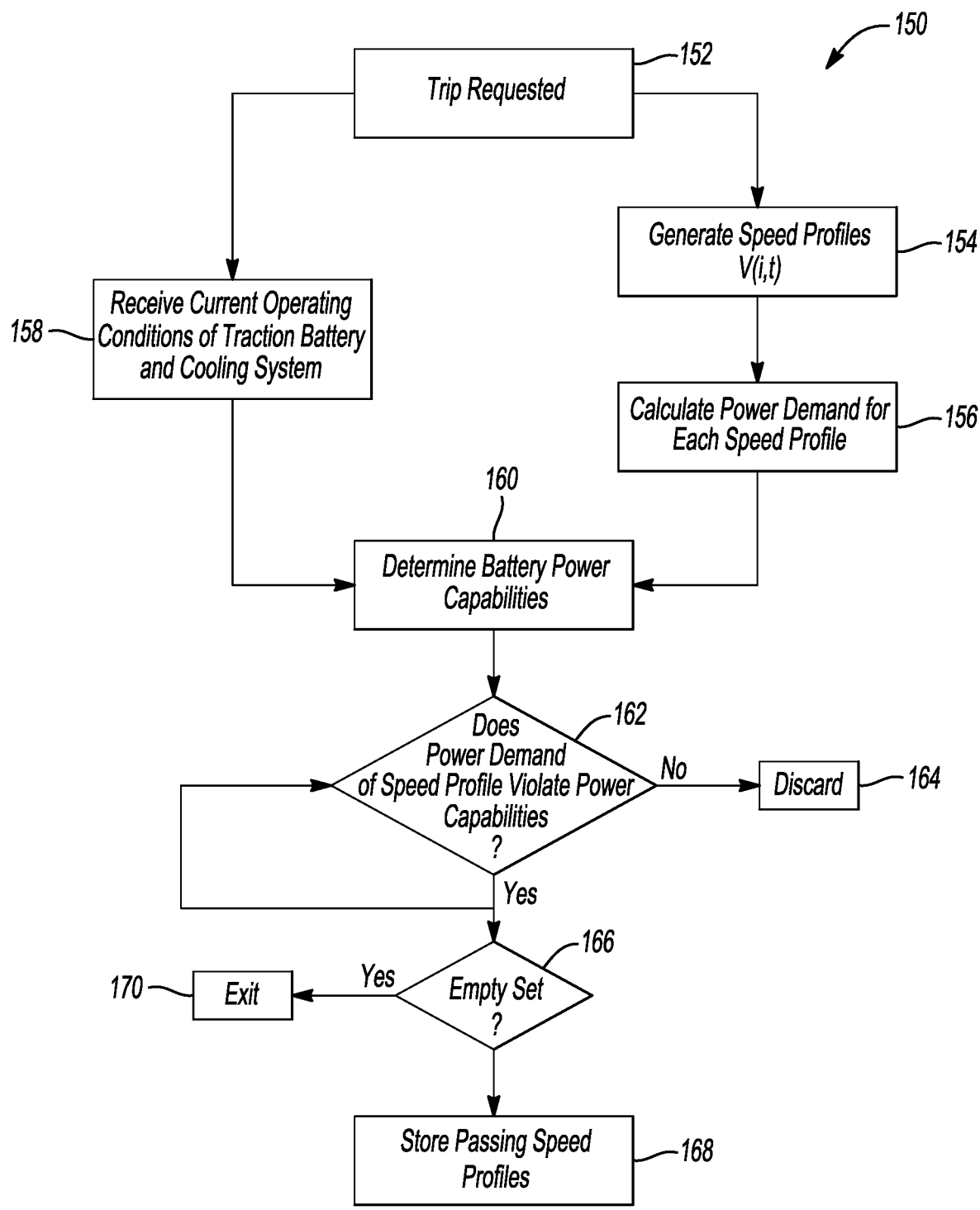
FIG. 4 is a flow chart illustrating an algorithm for generating a plurality of possible vehicle speed profiles for a route.

FIG. 4 is a flow chart 150 illustrating a method/controls for calculating one or more vehicle speed profiles for use during autonomous driving of the vehicle 20. The processes, systems, methods, heuristics, etc. described herein may be described as occurring in an ordered sequence although such processes could be performed with the described steps completed in an order other than the order described or illustrated. It should be understood that certain steps could be performed simultaneously, that other steps could be added, or that certain steps described herein could be omitted while keeping with the teachings of this disclosure and being encompassed by the claimed subject matter. The descriptions of methods or processes are provided for the purpose of illustrating certain embodiments, and should be understood to be representative of one of many variations and not limited to only those shown or described. As generally understood by those of ordinary skill in the art, the system or method may be implemented through a computer algorithm, machine-executable code, or software instructions programmed into one or more suitable programmable devices associated with the vehicle.

Referring to FIG. 4, the flowchart begins at operation 152 where the controller receives a trip request from a vehicle occupant. The trip request may be an end destination, e.g., address, cross roads, business, etc., input by the occupant. In response to receiving the address, the controller may utilize a mapping system to calculate a route between the current destination and the end destination.

At operation 154, the controller generates a plurality of speed profiles V(i,t) for the route. The speed profiles may be for the entire route or for a segment of the route. Each speed profile includes one or more propulsion commands for the electric powertrain. The speed profiles may include a constant speed, such as in the example of FIG. 3, or variable speeds. Governmental minimum and maximum speed limits for the route may be considered in generating baseline speed profiles, and additional speed profiles derived therefrom may be generated to create a spectrum of possible speed profiles at operation 154.

At operation 156, the controller calculates vehicle power demand P(i,t) for each of the speed profiles. The power demand represents the amount of power that must be supplied by the traction battery in order to execute the speed profile. Vehicle accessory load power can be estimated and included in the vehicle power demand. At operation 158, the controller receives current operating conditions of the traction battery and of the battery-cooling system.

The outputs of operations 156 and 158 are passed to operation 160 where the controller determines battery capabilities. The battery capabilities may include the battery state of charge, predicted battery temperature, the battery power charge limit (positive value), and the battery power discharge limit (negative value).

At operation 162, the controller tests the speed profiles of 154 to determine if any violate the power capabilities of operation 160. For example, the controller may determine if the vehicle power demand P(i,t) is greater than the charge limit or less than the discharge limit. If yes, that profile violates the power capabilities and is discarded at operation 164. The controls of operation 162 are looped until all of the speed profiles have been tested. Profiles that pass the test of operation 162 are saved in a set for later use and those that do not are discarded.

At operation 166, the controller determines if the set has any entries. If yes, control passes to operation 168 and the set is stored for later use in phase 2. If the set is determined to be empty at operation 166, control passes operation 170 and the flowchart 150 is exited. Once exited, the controller may initiate other algorithms to operate the vehicle without violating the power capabilities. For example, control may loop back to generate a new speed profile that limits battery power.

Figure 5:
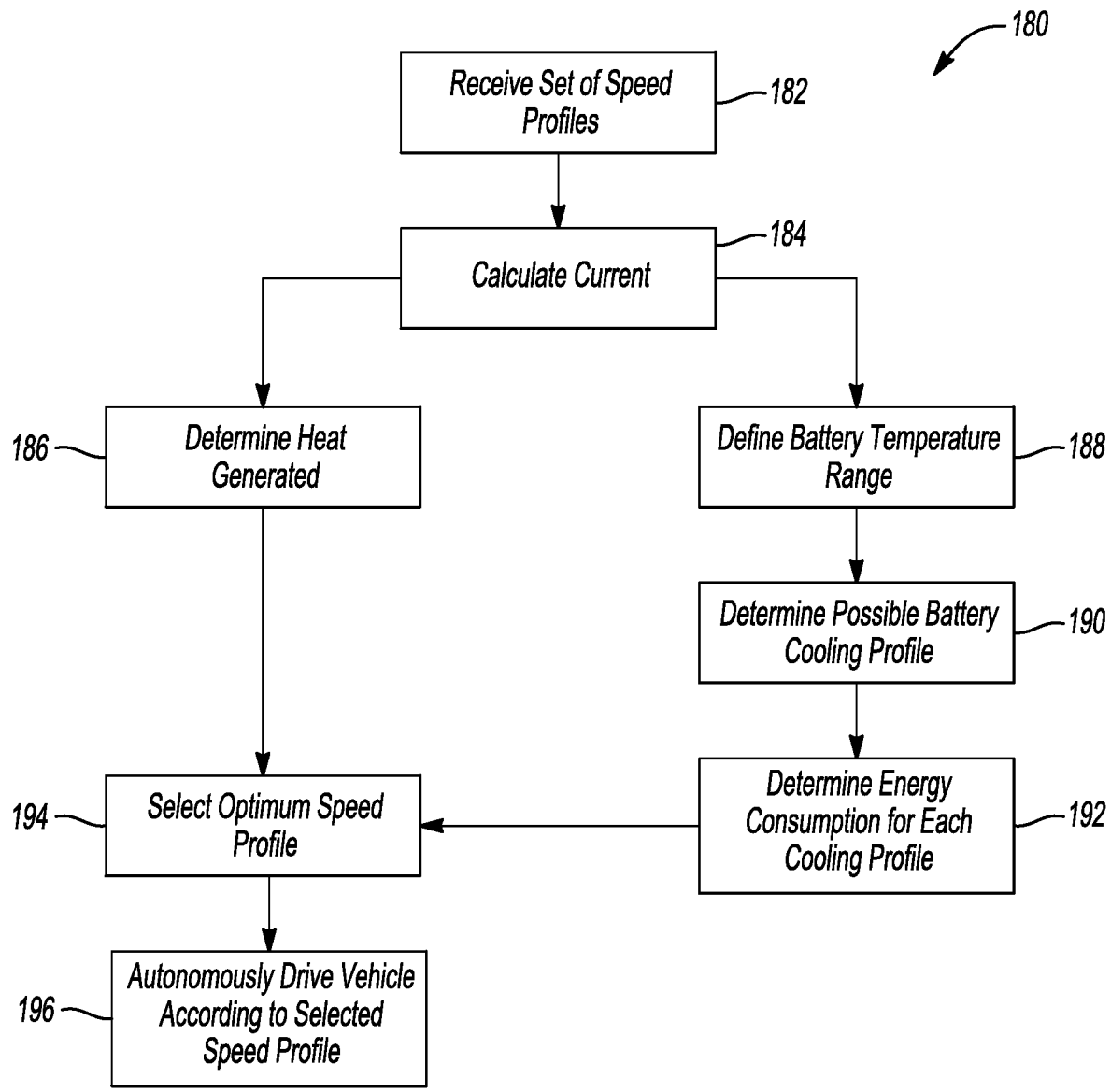
FIG. 5 is flow chart illustrating an algorithm for selecting one of the possible vehicle speed profiles for use while autonomously driving a vehicle.

Referring to FIG. 5, a flow chart 180 is used to optimize the set of profile from operation 168. In the method illustrated in flow chart 180, each of the speed profiles are studied to determine the amount of battery heat generated and the battery cooling efficiencies. An optimum speed profile is then output based on the battery heat generated and the battery cooling efficiencies.

At operation 182, the controller receives the set of speed profiles output by the algorithm 150. At operation 184, the controller calculates, for each profile, the current (I) required from the battery in order to deliver the speed profile. Using the current calculations from operation 184, the controller determines the heat generated for each speed profile at operation 186. The heat generated may be calculated using equation 2. As can be seen, the battery current is a predominate factor for heat generated. Thus, speed profiles that reduce the amount of charging and discharging generate less heat and demand less on the vehicle cooling system 54.

$$\text{heat generated} = \int_0^t I^2 R(SoC, T_{bat}) dt \qquad (\text{eq. 2})$$

The output of operation 184 is also passed to operation 188 where the controller defines a battery temperature range. The battery temperature may range includes an upper limit and a lower limit. Batteries are maintained between the upper and lower limits to prevent damage to the battery cells and to prolong life of the battery. As discussed above, the vehicle may be programmed to power limit the battery if the battery temperature falls outside of this defined range.

At operation 190, the controller determines one or more battery-cooling profiles for each of the vehicle speed profiles. The battery-cooling profiles are generated such that the battery temperature remains within the upper and lower limits. Multiple cooling profiles, that maintain the battery within the limits, can be generated for each vehicle speed profile by modifying the heat convection coefficients (h) and other factors. For example, the cooling profiles may include time-varied convection coefficients (h) to generate multiple cooling profiles. As explained above, the energy associated with providing the different coefficients varies. As such, the different cooling profiles will require a different amount of energy to execute.

At operation 192 the controller determines the energy-consumption value for each of the cooling profiles, and identified the cooling profiles with the minimum energy-consumption value for each vehicle speed profile. The energy consumption for identified cooling profiles may be calculated using equation 3.

$$\text{energy} = \int_0^t h_i (T_{bat} - T_{enviroment}) dt \qquad (\text{eq. 3})$$

The output of operation 186 and the output of operation 192 are fed into operation 194 where the controller chooses an optimum speed profile. Equation 4 may be used to determine the optimal speed profile, where w is a weighting factor, heat generated is the output of operation 186, and energy is the output of operation 192. The weighting factor can be adjusted according to the preference of the design and the specific components of the vehicle.

$$\min = (w \times \text{heat generated}) + ((1-w) \times \text{energy}) \qquad (\text{eq. 4})$$

The optimum speed profile is the profile that minimizes equation 4. The optimum speed profile is saved and sent to control modules associated with autonomous driving. The controller 50, responsive to the occupant requesting departure, then generates commands to various vehicle systems to autonomously drive the vehicle at operation 196. For example, the controller may command the traction battery 30 to provide voltage and current to the electric machine(s) 22 according to the selected speed profile. The controller may also command steering commands and the like to autonomously drive the vehicle 20.

Figure 6:
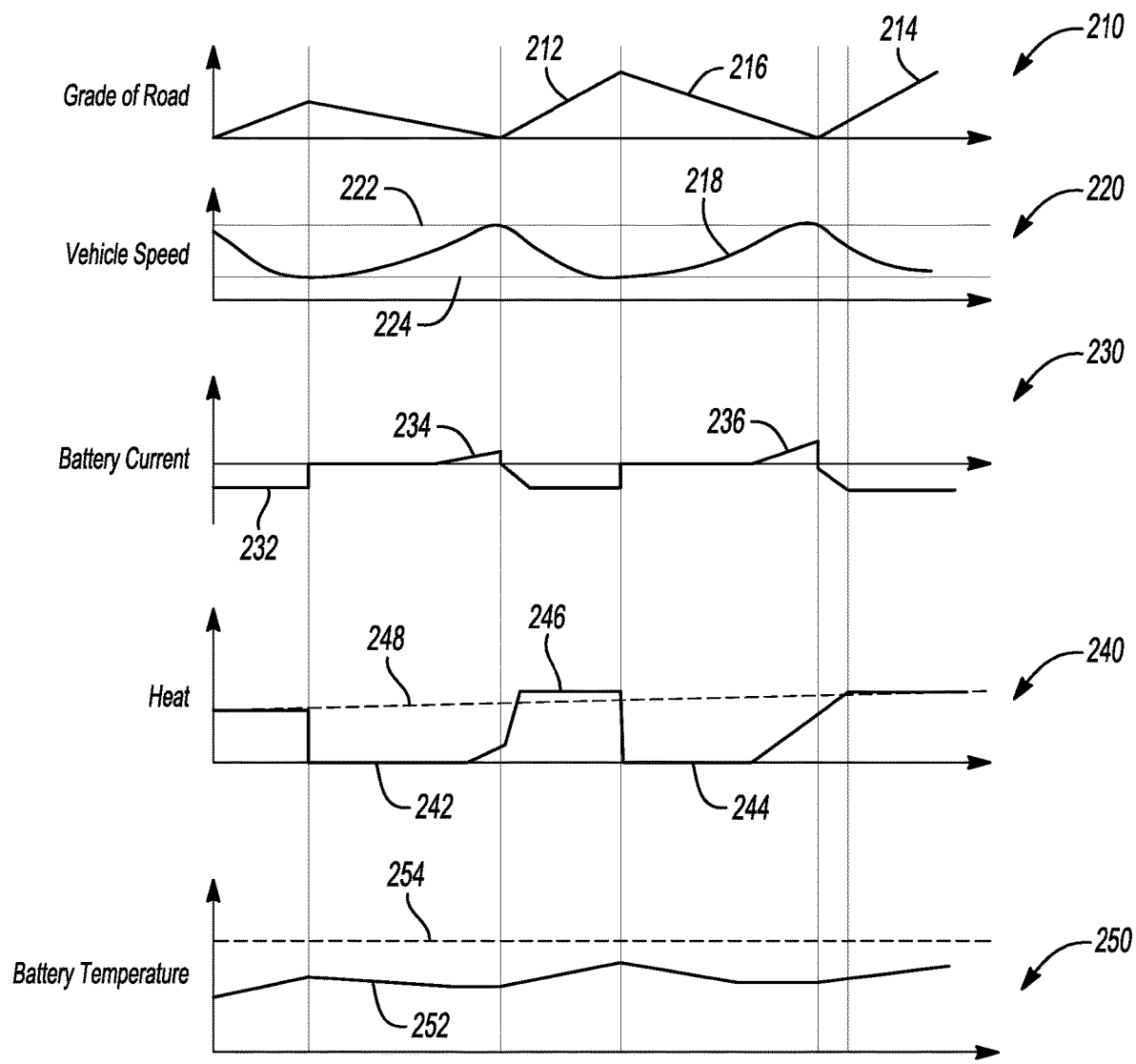
FIG. 6 is a series of plots showing vehicle operating conditions for a segment of a route according to this disclosure.

Operating the vehicle using the methods of FIGS. 4 and 5 may prolong battery life, increase electric range, and reduce power limiting of the traction battery. FIG. 6 illustrates the same driving cycle as FIG. 3 but with the vehicle 20 according this disclosure. As will be explained below in more detail, the teachings of this disclosure avoid power limiting of the battery by significantly reducing heat generation of the traction battery and increases electric range by operating the battery-cooling system more efficiently.

Referring to FIG. 6, the plot 210 illustrates the road grade for a segment 212 of the route. This particular segment 212 includes sections of increasing road grade 214 (uphill sections) and decreasing road grade 216 (downhill sections).

The vehicle speed profile 218, which was selected using the method/controls of this disclosure, for the segment 212 is variable as shown in plot 220. The vehicle speed profile 218 is varied to reduce the workload on the electric machine 22, which reduces the amount of current the battery 30 must supply to the electric machine 22. The vehicle speed profile 218 has reduced values corresponding to the uphill sections 214 and increased values corresponding to downhill sections 216. The vehicle speed profile 218, while varied, remains within a range between maximum and minimum speed limits 222, 224.

In comparing the battery current plot 230 with the battery current plot 103, the variable speed profile 218 reduces the charging 234 and discharging currents 232. Reducing vehicle speeds for the uphill sections 214 reduces the required battery discharge current 232, and increasing vehicle speeds for the downhill sections 216 allows the vehicle 20 to reduce the charge currents 234 by coasting for portions of the downhill sections 216 until regenerative breaking is required to prevent the vehicle from exceeding the upper speed limit 222.

During coasting, the battery 30 is not supplying current and thus is not generating heat as shown in plot 240 at portions 242 and 244, for example. During the downhill sections 216 the generated heat 246 is substantially below the capacity 248 of the battery-cooling system 54. The controller can command the battery-cooling system 54 to operate at a relatively high duty cycle at least during the portions 242 and 244 to reduce the battery temperature and precondition the battery 30 from the next discharge cycle so that the battery temperature 252 remains below the upper temperature limit 254 as shown in plot 250. In this example, unlike FIG. 3, the battery 30 is not power limited and the vehicle 20 can be operated as planned throughout the route. The battery 30 does not have to be power limited because current commanded to execute the speed profile 218 has an aggregate value of heat generated, e.g., integral of line 246, over the segment 212 is less than an aggregate value of cooling capacity, e.g., integral of line 248, of the battery-cooling system 54 over the segment 212.

While the speed profile 218 includes variable speed, not all speed profiles selected by the method/controls of FIGS. 4 and 5 will have variable speeds within a segment of a route. The controller may be programmed to operate at a constant speed, e.g., the speed limit of the road, whenever possible as most occupants prefer to drive at the speed limit. The speed profile may be constant for at least one segment of the route responsive to predicted battery temperatures for that segment not exceeding a threshold, e.g., upper temperature limit. The route segment 212, however, do to elevations changes, cannot have a constant speed profile that maintains the traction battery 30 below the upper temperature limit 254. In response to the controller determining that predicted battery temperatures for a constant speed profile would exceed the upper temperature limit, a variable speed profile, such as profile 218, is selected such that actual battery temperatures for the segment remain below the upper temperature limit.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. An autonomous vehicle comprising:
an electric powertrain; and
a controller programmed to
autonomously operate the powertrain to propel the vehicle along a segment of a route according to a predetermined first speed profile that has a constant vehicle speed responsive to predicted battery temperatures for the segment not exceeding a threshold, and
autonomously operate the powertrain to propel the vehicle along the segment according to a predetermined second speed profile that has multiple vehicle speeds responsive to the predicted battery temperatures exceeding the threshold such that actual battery temperatures remain below the threshold for the segment.

2. The autonomous vehicle of claim 1, wherein the segment includes at least one portion with increasing road grade and at least one portion with decreasing road grade.

3. The autonomous vehicle of claim 2, wherein the second speed profile has a greater vehicle speed for the portion with decreasing road grade, and has a lesser vehicle speed for the portion with increasing road grade compared to the first speed profile.

4. The autonomous vehicle of claim 1, wherein the electric powertrain includes a traction battery and an electric machine configured to receive power from the traction battery, and further comprising a battery-cooling system.

5. The autonomous vehicle of claim 4, wherein the second speed profile is based on a heat-convection coefficient of the battery-cooling system.

6. The autonomous vehicle of claim 4, wherein the second speed profile is derived from comparing multiple energy-consumption values of the battery-cooling system and wherein each energy-consumption value corresponds to a different heat-convection coefficient of the battery-cooling system.

7. The autonomous vehicle of claim 4, wherein the second speed profile is predicted to generate a lesser aggregate value of heat generated by the traction battery over the route than an aggregate value of cooling capacity of the battery-cooling system over the route.

8. The autonomous vehicle of claim 7, wherein the first speed profile is predicted to generate a greater aggregate value of heat generated by the traction battery over the segment than the aggregate value of heat generated by the traction battery by the second speed profile.

9. The autonomous vehicle of claim 1, wherein the second speed profile is based on a predicted heat generated by a traction battery.

10. An autonomous vehicle comprising:
an electric powertrain including an electric machine and a traction battery; and
a controller programmed to command power to the electric machine to propel the vehicle along a segment of a route according to a predetermined speed profile that is derived from a predicted heat generation of the traction battery for the segment such that actual temperatures of the battery remain below a temperature threshold for the segment.

11. The autonomous vehicle of claim 10, wherein the predetermined speed profile is further derived from power limits of the traction battery.

12. The autonomous vehicle of claim 10, wherein the segment includes at least one portion with increasing road grade and at least one portion with decreasing road grade, and the speed profile includes decreasing speed for the portion with increasing road grade, and increasing speed for the portion with decreasing road grade.

13. The autonomous vehicle of claim 10 further comprising a battery-cooling system, wherein the speed profile is further derived from comparing multiple energy-consumption values of the battery-cooling system, wherein each of the energy-consumption values corresponds to a different heat-convection coefficient of the battery-cooling system.

14. The autonomous vehicle of claim 10, wherein the speed profile is predicted to generate a lesser aggregate value of heat generated by the traction battery over the segment than an aggregate value of cooling capacity of the battery-cooling system over the segment.

15. An autonomous vehicle comprising:
a traction battery;
an electric powertrain powered by the traction battery; and
a controller programmed to:
generate a plurality of speed profiles for a route, wherein the speed profiles include propulsion commands for autonomously operating the electric powertrain to propel the vehicle,
determine a power capability of the traction battery,
discard ones of the speed profiles that have a power demand of the traction battery exceeding the power capability,
store, in a set, ones of the speed profiles that have a power demand of the traction battery less than the power capability,
for each of the speed profiles in the set, determine an associated predicted heat generation of the traction battery and an associated cooling profile for the traction battery,
select an optimum one of the speed profiles based on the predicted heat generation and the cooling profile, and command power to the electric powertrain according to the optimum one of the speed profiles.

16. The autonomous vehicle of claim 15, wherein the select the optimum one of the speed profiles includes (i) for each of the speed profiles in the set, summing a first term based on the predicted heat generation and a second term based on the cooling profile to generate a plurality of values and (ii) selecting a one of the speed profiles having a smallest of the values as the optimum speed profile.

17. The autonomous vehicle of claim 15, wherein the electric powertrain includes an electric machine configured to receive power from the traction battery, and further comprising a battery-cooling system.

18. The autonomous vehicle of claim 17, wherein the optimum one of the speed profiles has an aggregate value of the heat generated by the traction battery over the route that is less than an aggregate value of cooling capacity of the battery-cooling system over the route.

* * * * *